Dec. 8, 1931.    J. C. SAVAGE    1,835,970
APPARATUS FOR USE IN THE FORMATION OF TRAILS OF VISIBLE, LUMINOUS
OR POISON LADEN MATERIAL FROM AERIAL OR OTHER CRAFT
Filed May 14, 1928

INVENTOR
J. C. Savage
BY
Langner, Parry, Card & Langner
ATTORNEY

Patented Dec. 8, 1931

1,835,970

UNITED STATES PATENT OFFICE

JOHN CLIFFORD SAVAGE, OF LONDON, ENGLAND

APPARATUS FOR USE IN THE FORMATION OF TRAILS OF VISIBLE, LUMINOUS, OR POISON LADEN MATERIAL FROM AERIAL OR OTHER CRAFT

Application filed May 14, 1928, Serial No. 277,689, and in Germany May 20, 1927.

The present invention relates to the production of trails of visible luminous or poison laden material from vehicles particularly aircraft for the purpose of forming signs, signals or the like in the air or for the treatment of areas of land, water growing crops or the like for the destruction of insect pests, fungoid growths or the like.

More particularly though not exclusively the present invention relates to apparatus applicable to vehicles such as rotary engined aeroplanes in which no convenient source of heat is available.

The chief object of the present invention is to provide improved means of simple and reliable form for the purpose specified and more particularly to provide means whereby the formation of the trails may be immediately and accurately controlled.

A further object of the invention is to provide apparatus in which substantially the whole of the material available may be converted into suitable form for the purpose herein specified with or without the use of heat.

The above and other features of the present invention will now be described in detail with reference to the accompanying drawings diagrammatically illustrating by way of example one convenient form of the invention.

In the drawings:—

Figure 1:
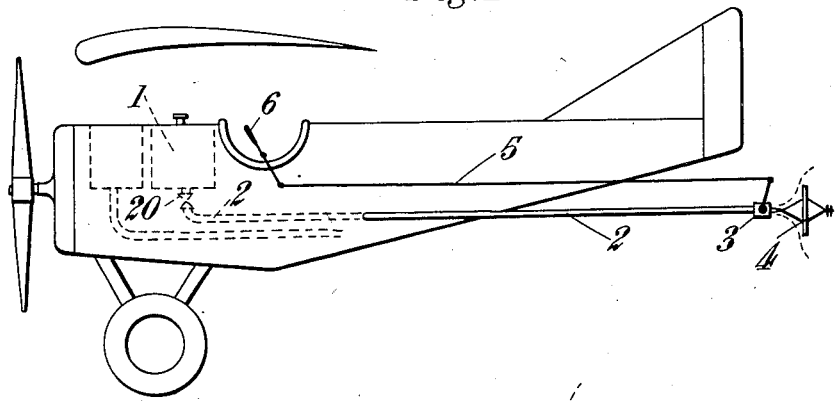
Figure 1 is a diagrammatic side elevational view of an aeroplane equipped with means according to the invention.

Referring first to Figure 1 the numeral 1 indicates a receptacle in which the trail producing material is stored and 2 a pipe line by means of which it may be led to a suitable point of discharge here indicated as at the rear of the aeroplane. The discharge of the material from the pipe line 2 may be controlled by a valve 3 which may be located in any convenient position but which is preferably located toward the end of the pipe 2 and immediately in front of an atomizing device 4 of any suitable form. The operation of the valve 3 may conveniently be controlled—as for example by a Bowden wire 5 and lever 6—by the pilot of the aeroplane and if desired similar means may be provided for controlling the operation of the atomizing device 4.

Figure 2:
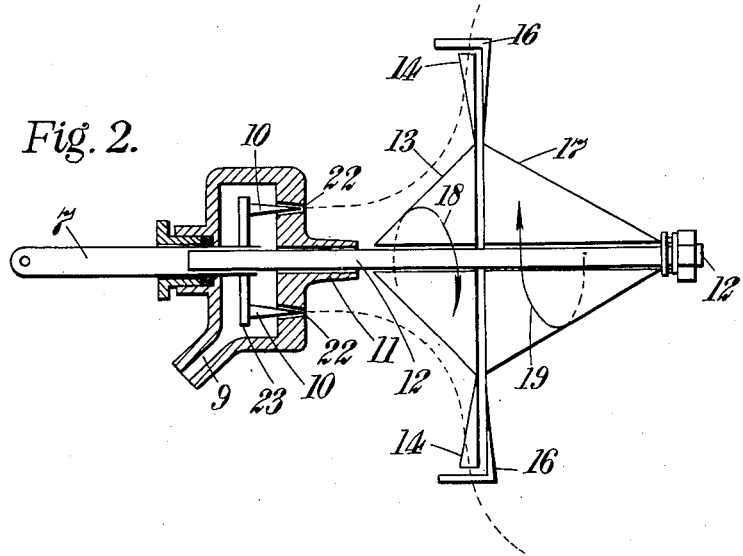
Figure 2 illustrates diagrammatically one form of valve and atomizing device in accordance with the invention.
Figure 3:
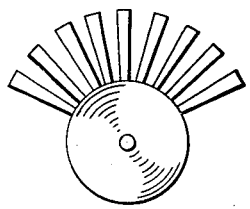
Figure 3 illustrates a diagrammatic front elevational view of the atomizing device.

In Figs. 2 and 3 I have illustrated diagrammatically one suitable form of valve 3 and atomizing device 4 suitable for dealing with a trail forming material which is strongly hygroscopic such as stannic tetrachloride ($SnCl_4$) without clogging but I wish it to be clearly understood that any suitable form of valve or atomizing device may be used without departing from the present invention.

As shown the valve 3 comprises a casing enclosing a space 23 to which the material is led from the pipe 2 by a passage or channel 9. The valve casing is provided with a number of jets or openings 22 preferably conical in form through which the material may be discharged and which are controlled by means of a number of needle-like elements 10—preferably conical in form to correspond with the openings or jets 22—mounted upon a stem 7—controllable in the manner hereinbefore described—projecting from the casing. A suitable gland or glands may be provided to prevent leakage of the material from the casing. With such a valve construction if any material collects in the neighbourhood of the jets 22 by virtue of the strong hygroscopic action of the material in use, it will be immediately cleared by operation of the valve.

As previously stated the atomizer 4 may be of any suitable form but as shown in Figs. 2 and 3 it comprises a pair of bladed wheels 13, 14 and 16, 17 rotatably mounted upon a shaft 12 here shown as journalled in an extension 11 of the valve casing. The bladed wheels 13, 14 and 16, 17 are preferably adapted to rotate in opposite directions and may for example in the case of an aeroplane be rotated by the air stream created by the passage of the aeroplane through the air or separate mechanism may be provided for this purpose for example a separate motor may be provided or the bladed wheels may be rotated by suitable connections with the propelling engine of the vehicle.

In the example illustrated the wheels 13, 14 and 16, 17 are each provided with a conically shaped hub portions 13 and 17 about which the blades 14 and 16 are disposed the blades 17 being bent over or otherwise formed at their outer periphery to extend over the outer periphery of the blades 14 for the purpose hereinafter specified.

In operation and with the wheels rotating in opposite directions as indicated by the arrows 18 and 19 the material issuing from the jets or openings 22 of the valve 3 traverses a path such as indicated by the dotted lines in Figure 2. In this way the particles of material are projected outwardly owing to the rotation of the bladed wheel 13, 14 and are then caught by the bent over portions of the wheel 16, 17. In this way the material in so far as it is not atomized by the first bladed wheel is completely atomized by the second bladed wheel.

If desired further bladed wheels may be provided depending upon the material under treatment and the degree of atomization required.

As already stated the device herein shown and described is particularly suitable for use in cases in which the trail producing material is of a hygroscopic nature. Where, however, the trail is produced by the interaction or commingling of two or more ingredients such for example as ammonium hydrate ($NH_4HO$) and hydrochloric acid ($HCl$) separate receptacles pipe lines and valves controlling the supply of said ingredients may be provided and the ingredients may be atomized and commingled by a single atomizing means or each ingredient may be atomized by a separate atomizer and all the atomizers disposed in close relation to each other in such a manner as to ensure that substantially all the ingredients are commingled.

If desired a valve 20 may be provided for controlling the flow of the trail forming material from the pipe.

What I claim is:—

1. For an aerial or other vehicle for use in the formation of trails of visible luminous or poison laden material, apparatus comprising a receptacle for said material, a pipe line for conducting the material to a convenient point of discharge, atomizing means disposed to atomize thoroughly the material issuing from said pipe line and a non-clogging valve including a casing having a plurality of discharge orifices controlled by needle-like elements located in said pipe line adjacent to said atomizing means.

2. For an aerial or other vehicle for use in the formation of trails of visible luminous or poison laden material, apparatus comprising a receptacle for said material, a pipe line for conducting the material to a convenient point of discharge, atomizing means disposed to atomize thoroughly the material issuing from said pipe line, a non-clogging valve including a casing having a plurality of discharge orifices controlled by needle-like elements located in said pipe line adjacent to said atomizing means and means whereby said valve is controllable by an occupant of the vehicle.

3. For an aerial or other vehicle for use in the formation of trails of visible luminous or poison laden material, apparatus comprising a receptacle for said material, a pipe line conducting the material to a convenient point of discharge, atomizing means including a pair of oppositely rotatable bladed wheels disposed to atomize thoroughly the material issuing from said pipe line, a non-clogging valve in said pipe line preferably adjacent to said atomizing means, and means for controlling the operation of said atomizing means by an occupant of the vehicle.

4. For an aerial or other vehicle for use in the formation of trails of visible luminous or poison laden material, apparatus comprising in combination a receptacle for said material, a pipe line for conducting said material to a convenient point of discharge and bladed wheels rotatable in opposite directions disposed relatively to one another so as to atomize thoroughly the material issuing from said pipe line.

5. For an aerial or other vehicle for use in the formation of trails of visible luminous or poison laden material, apparatus comprising in combination a receptacle for said materal, a pipe line for conducting the material to a convenient point of discharge and atomizing means including a pair of wheels rotatable in opposite directions and each having radial blades, the blades of one wheel being each provided with a circumferential lip extending about and spaced from the periphery of the blades of the other wheel so as to atomize thoroughly the material issuing from said pipe line.

In testimony whereof I have signed my name to this specification.

JOHN CLIFFORD SAVAGE.